Figure 1:
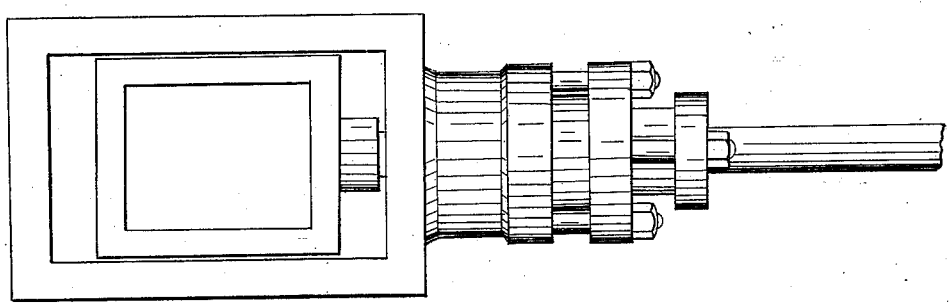
Figure 2:
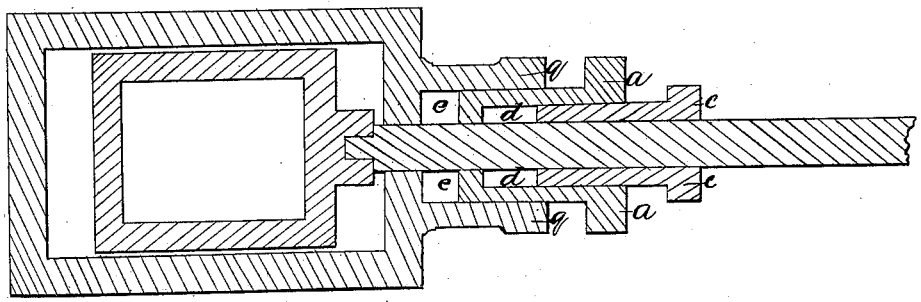

T. J. Hudson,
Stuffing-Box.

No. 25,829. Patented Oct. 18, 1859.

Witnesses:
John D. Whitford
S. R. Parrott

Inventor:
Thos. J. Hudson

UNITED STATES PATENT OFFICE.

THOMAS J. HUDSON, OF NEWBERN, NORTH CAROLINA.

PACKING PISTON-RODS OF STEAM-ENGINES.

Specification of Letters Patent No. 25,829, dated October 18, 1859.

*To all whom it may concern:*

Be it known that I, THOMAS J. HUDSON, of Newbern, in the county of Craven, and in the State of North Carolina, have invented a new and improved mode of preventing the leakage of steam from steam chests or steam cylinders through the stuffing boxes and glands attached to the same, and do hereby declare that the following is a full and exact description thereof, reference being had to the accompanying drawings, and to the letters of reference marked thereon.

No. 1, is a top view. No. 2, is a section of the same.

The nature of my invention consists of a combination of stuffing boxes and glands, one within the other, with hemp or rubber packing intervening, the first layer of which receiving the full heat of the steam, prevents the heating of the second layer which being always moist, and elastic, preserves the valve stem or piston rod from cutting or rusting, and by this means prevents the leakage of steam between the packing, and the rod or stem.

To enable others skilled in the art to make and use my invention, I will proceed to describe its construction and mode of operation.

A, A, is an ordinary gland, of brass or iron, fitted in the stuffing box $b$, $b$; this gland is bored of a size sufficient to receive the extra gland $c$, $c$, (which is of either material) and of a depth to leave a half or three fourths of an inch of metal between the two layers of packing in $d$, $d$, and $e$, $e$.

$e$, $e$, is filled with either rubber or hemp packing, or with both, and the gland or stuffing box A, A, is screwed upon it sufficiently hard to prevent leakage, but not to bind the stem or rod; this packing receiving the whole heat of the steam, is separated from the packing in $d$, $d$, by the bottom of the gland or stuffing box A, A. The second layer of packing in $d$, $d$, is preserved by the means before described and is always moist and elastic, thereby preserving the stem or rod from cutting and preventing the leakage of steam through the glands and boxes.

Having thus fully described the nature of my invention, what I claim therein as new and desire to secure by Letters Patent, is—

The method of packing the gland A, A, and applying the gland $c$, $c$, with the packing in $d$, $d$.

THOS. J. HUDSON.

Witnessed by—
   JOHN D. WHITFORD,
   I. K. PERROTT.